Feb. 14, 1967  LE ROY D. GORE  3,303,922
CONVEYOR MECHANISM FOR PRODUCT DISPENSING MACHINE
Filed Oct. 20, 1965  2 Sheets-Sheet 1
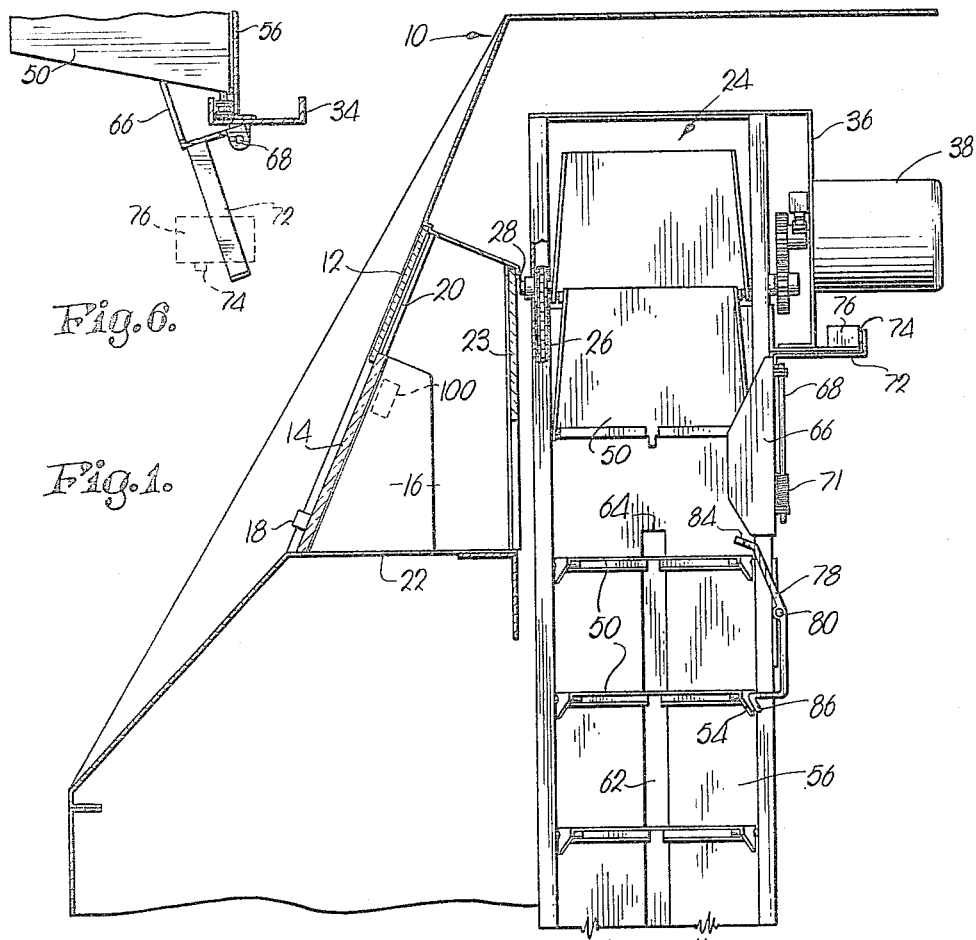
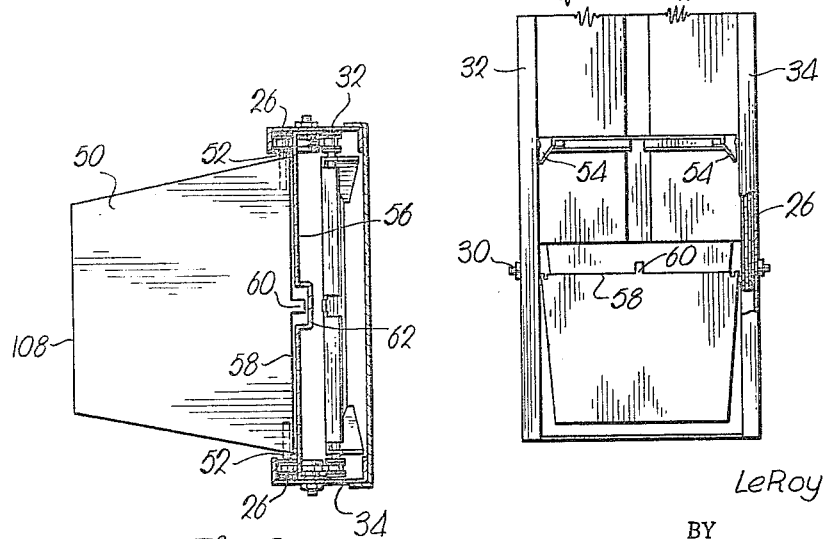
INVENTOR.
LeRoy D. Gore
BY
Hovey, Schmidt, Johnson & Hovey
ATTORNEYS

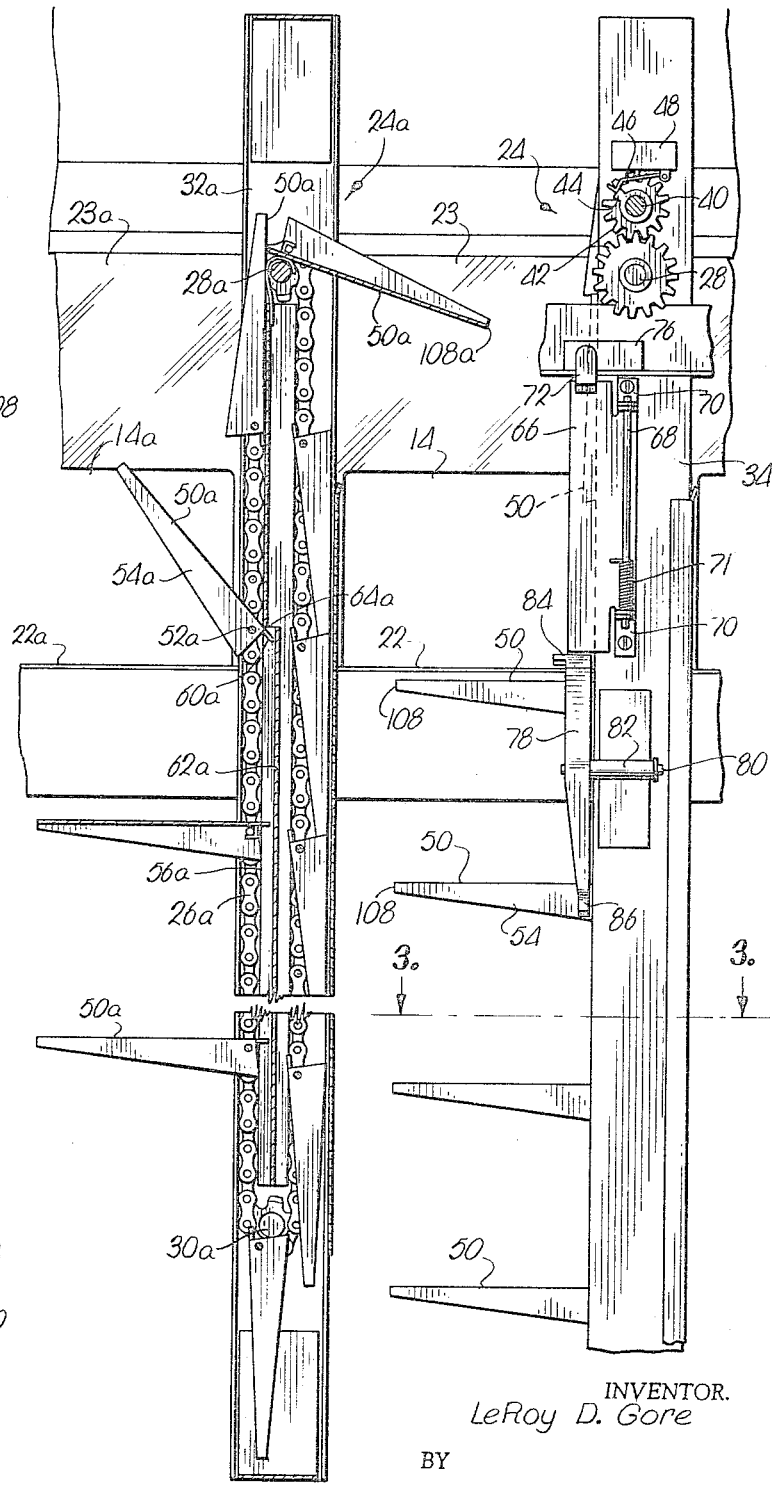
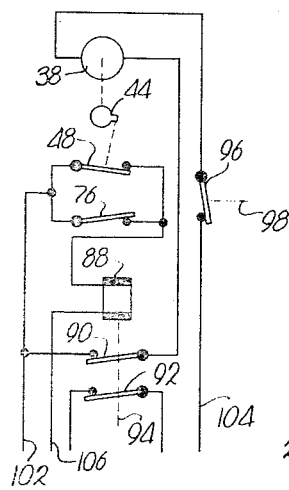
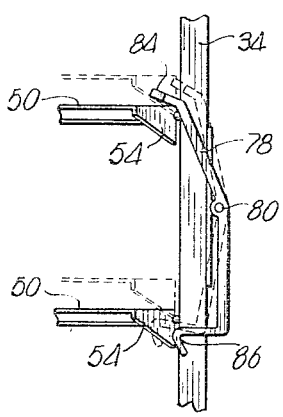

United States Patent Office 3,303,922
Patented Feb. 14, 1967

3,303,922
CONVEYOR MECHANISM FOR PRODUCT
DISPENSING MACHINE
Le Roy D. Gore, Independence, Mo., assignor to The
Vendo Company, Kansas City, Mo., a corporation of
Missouri
Filed Oct. 20, 1965, Ser. No. 498,893
11 Claims. (Cl. 198—158)

This invention relates to improvements in conveyor mechanisms for dispensing or vending machines and, more specifically, to improvements in vertical product conveyors therefor in order to enable the consumer to have an unobstructed view of the product to be dispensed, provide for maximum product capacity, and other refinements.

Dispensing machines for frozen food products, such as ice cream or the like, have commonly utilized upright vertically-moving conveyors having a plurality of shelves for carrying the products. In dispensing operation after product selection, the conveyor sequentially shifted each shelf to a consumer accessible location where the product was removed by the consumer upon opening a door forwardly of the product shelf. Thus the consumer heretofore has not usually been given the opportunity of viewing the products prior to making his selection. Manifestly it would be advantageous if the consumer had an unobstructed view of all the different products which are offered by the machine. To this end, in the case of machines using horizontally moving conveyors, transparent doors have sometimes been provided with the product displayed therebehind prior to purchase. However, the horizontal conveyor systems tend to result in the inefficient utilization of space and, furthermore, when the machine must handle numerous selections, some of these selections must be located at levels so low or high that it becomes extremely awkward for the consumer to patronize the same. On the other hand, the vertical-type conveyor systems usually permit efficient space utilization and, of course, allow the choice of a most suitable common level for product dispensing. This level seems to correspond relatively closely with that usually encountered in modern cafeterias.

If a vertical-type conveyor is to be capable of handling a maximum of products, it is manifest that the vertical spacing between adjacent shelves must be kept to a minimum. With such minimum spacing, product viewing from a point above product level tends to be unacceptably obstructed by the overlying shelf.

It is therefore the primary object of this invention to provide vertical conveyor mechanism capable of permitting unobstructed viewing by the consumer of the products to be dispensed. In this connection, it is an important object of the present invention to retract each shelf from which product has been dispensed immediately thereafter to an upstanding position in a vertical plane where it cannot obstruct viewing of the next product to be dispensed. The reason the position should be an upstanding rather than a depending one in the present case will become evident hereafter.

It is conventional for the horizontal shelves of vertical-type conveyors to move upwardly while carrying products and to subsequently assume a hanging position in a vertical plane during return to the lower end of respective conveyors in order to conserve space between adjacent conveyors. The designer usually has a choice at the upper extremity of such conveyors of either turning the shelf through an approximate 270° arc around the sprockets into a vertical hanging position or allowing the shelf to fall through an arc in the opposite direction into such position and then passing the shelf between the sprockets. The latter choice in the present instance would necessitate spacing the shelves at least as far apart as the shelf width dimension plus the height of products carried thereon since the shelves must each be oriented, as abovesaid, in the vertical plane prior to removal of product from the respective succeeding shelves. On the other hand, if the shelves were swung over the sprockets at the top of the conveyors, then they need not be spaced appreciably further apart than the height of products carried but must be provided with clearance for their width dimension throughout the full arc of their movement. Obviously, this requirement would ordinarily tend to nullify the achievement of maximum space conservation between adjacent conveyors which is the potential of hanging the shelves vertically while the same return to the lower ends of respective conveyors.

Consequently, it is another very important object of the invention to dispose the conveyors so as to take advantage of the space provided toward the upper end of each conveyor by the abovesaid upstanding orientation of shelves from which product has been dispensed, in order to accommodate the top most shelf of the adjacent conveyor on one side thereof while the shelf swings through the remaining 180° arc necessary to place it in a vertically depending position for return to the lower end of the respective conveyor.

Another object of the instant invention is to provide means operable in conjunction with the aforesaid shelf-retracting means to disable the conveyor in the event that a consumer fails to remove the selected product to thereby prevent damage from jamming of the conveyor mechanism.

Additionally, it is a further object of the invention to provide a disabling means as aforesaid which also deactivates the conveyor adjacent the extended shelves of the disabled conveyor in order to prevent the possibility of interengagement of the shelves of the two conveyors until normal operation of the first conveyor is restored.

Another object of the instant invention is to provide an antitheft device which positively prevents a consumer from manually manipulating the shelf carrying the product to be dispensed to retract the same and thereby gain access to the product on the adjacent loaded shelf.

In the drawings:
FIGURE 1 is a vertical sectional view through the cabinet of a dispensing machine showing one of the conveyor mechanisms in side elevation;
FIG. 2 is a rear elevational view showing two adjacent conveyors;
FIG. 3 is a horizontal sectional view taken along line 3—3 of FIG. 2;
FIG. 4 is an enlarged, detailed, elevational view of the antitheft device as seen in FIG. 1;
FIG. 5 is a schematic diagram of the disabling circuit of one of the conveyors; and
FIG. 6 is a fragmentary, cross-sectional view through the conveyor control switch actuating mechanism of the machine.

The numeral 10 designates the cabinet of a dispensing machine shown fragmentarily in FIG. 1, the front of the machine being provided with a window 12 and a sliding transparent door 14 defining a consumer-access location 16 within cabinet 10. A handle 18 on door 14 facilitates opening thereof by upward movement along guide rod 20 away from the closed position shown where the lower edge of the door rests upon a platform 22. A transparent shield 23 is horizontally aligned with window 12 and extends a short distance therebelow, shield 23 being disposed in a vertical plane extending between door 14 and an upright product conveyor 24.

The conveyor 24 is shown in FIGS. 1 and 2 and comprises a pair of endless transport members in the form of link chains 26 each trained over an upper and a lower sprocket carried by upper and lower sprocket shafts 28 and 30 respectively. Shafts 28 and 30 are journalled in a pair of horizontally spaced uprights 32 and 34, the latter being provided with a mounting plate 36 for an electric drive motor 38 having an output shaft 40. A pair of meshing gears 42 interconnect drive shaft 40 and sprocket shaft 28 at the rearward end of the latter, drive shaft 40 also being provided with a cam 44 which is shown in engagement with the actuator arm 46 of a normally closed switch 48.

A plurality of shelves 50 are attached to conveyor chains 26 by opposed pivot pins 52 (FIG. 3) extending toward one another from respective chains 26. Each shelf 50 has a pair of depending side flanges 54 which engage the outwardly facing surface of a central panel 56 extending between chains 26. The inner margin 58 of shelf 50 is provided with a tab or projection 60 which is normally received in a vertical channel 62 formed in panel 56. As may be seen in FIG. 1, channel 62 extends upwardly to a disposition slightly above platform 22, whereupon channel 62 terminates to present an edge 64.

FIG. 2 illustrates a second conveyor 24a adjacent conveyor 24, these two conveyors being of identical construction; hence, the components of the two conveyors are identified by like reference numerals with the "a" notation being utilized to designate the components of conveyor 24a. The rear supporting upright for conveyor 24a is broken away in FIG. 2 so that one of the chains 26a is clearly visible. The left-hand stretch of chain 26a forms the upwardly moving stretch of the conveyor upon energization of the drive motor (not shown) of conveyor 24a, the right-hand stretch of chain 26a being the downwardly moving stretch of the conveyor. Thus, the action of edge 64a is apparent in FIG. 2 where it may be seen that projection 60a ultimately engages edge 64a to thereby swing its associated shelf 50a about pins 52a to an upright or retracted position. Except during return movement of the shelves by the downwardly moving conveyor stretch, the shelves are normally cantilever supported in the product storage zone in horizontally extending positions by their associated pins 52a and by virtue of sliding contact of flanges 54a with the adjacent surface of panel 56a.

An elongated, upright, transversely L-shaped, plate-like element 66 is mounted on upright 34 for rotation about a vertical axis defined by a vertical rod 68 carried by a pair of spaced brackets 70. A spring 71 is coiled about rod 68 and biases element 66 toward the normal position shown. Element 66 is provided with an outwardly extending, L-shaped finger 72 which engages and depresses the actuator button 74 of a normally open switch 76 to hold the same in the closed position. Engagement of finger 72 and button 74 limits the extent of movement of element 66 under the action of spring 71 to the position shown where the element is disposed for engagement by each shelf 50 as the same is raised away from location 16 by the conveyor.

An antitheft device comprising a locking arm 78 is attached to upright 34 for swinging movement about a horizontal axis defined by a horizontal hinge pin 80 rigid therewith and received by a hinge barrel 82 rigid with upright 34. As shown in FIGS. 1 and 2, the upper end portion 84 of arm 78 is bent forwardly and normally extends into spaced, overlying relationship to the shelf 50 adjacent location 16 and spaced just below edge 64. The lower end portion 86 of arm 78 also projects forwardly but engages the proximal side flange 54 of the adjacent, underlying shelf 50.

In FIG. 5 a disabling circuit for conveyor 24 is shown. It should be understood that each conveyor of the machine is provided with a circuit similar to the circuit of FIG. 5, the conveyor disabling circuits of adjacent conveyors being interconnected in a manner to be subsequently described.

Motor 38 and cam 44 are diagrammatically illustrated with the cam disposed to momentarily open switch 48 once during each revolution. Switch 76 is shown closed since its actuator button 74 is normally depressed by finger 72. A conveyor disabling relay is shown having a relay coil 88 operably coupled with relay switches 90 and 92 by armature 94. A relay switch 96 is connected in series with motor 38, switch 96 being operated by the armature 98 of a conveyor disabling relay in the circuit of the adjacent conveyor (not shown) to the right of conveyor 24 as viewed in FIG. 2. Switch 96 performs the same function in the motor circuit of conveyor 24 as switch 92 in the motor circuit of conveyor 24a.

In operation, the extended shelves of the conveyors are loaded with the products to be dispensed. Each conveyor may carry a different product in order to present the consumer with a variety of selections from which to choose. The product carried by a particular conveyor may be readily viewed and identified through the associated window 12 and door 14.

When the apparatus is operated as a vending machine, suitable coin-controlled mechanism (not shown) receives the deposited coinage and enables the door 14 of the appropriate conveyor to be fully opened by the customer to gain access to the selected product. Such mechanism is conventional in the art and commonly employs a totalizer which conditions a latch release circuit associated with the door of the selected column for operation once the proper amount of coinage has been deposited.

In FIG. 1, switch means 100 is illustrated by broken lines adjacent door 14. A standard approach in the art is to arrange the latch for door 14 such that slight movement of the door may be effected while it is in the latched condition. Such slight movement, however, effects closing of internal contacts within switch means 100 to energize the latch release solenoid of the door if sufficient coinage has been deposited.

Operation of switch means 100 to release the door latch also, through appropriate circuitry, effect momentary energization of motor 38 to move the extended shelf 50 adjacent edge 64 into exact horizontal alignment with platform 22. When the machine is in the stand-by position shown, it will be noted that this shelf is slightly below the level of platform 22.

The product on the delivery shelf may then be reached by the consumer through door 14 at access location 16. After removal of the product, the door slides downwardly and returns to its closed position, whereupon a circuit arrangement (not shown) responsive to door closure effects re-energization of motor 38 to shift the next loaded shelf 50 into the stand-by disposition just below the horizontal level of platform 22. This 2-phase operation of the conveyor is in accordance with an approach known in the art and similar to the concepts taught by Childers et al., U.S. Patent No. 3,190,489, and thus will not be described in detail herein.

When the machine is operated strictly as a dispenser, it will be appreciated that the coin controlled mechanism referred to above is not used and that, therefore, the doors of the machine are unlatched to permit the consumer to make a selection simply by opening the appropriate door and removing the desired product.

Retraction of the shelves 50a of conveyor 24a is clearly illustrated in FIG. 2. The shelf shown at an inclined position has just had its product removed therefrom and door 14a has closed to effect the second phase of conveyor operation. The inclined shelf 50a is shown as its projection 60a engages edge 64a to cause the shelf to swing in a clockwise direction about the associated pins 52a. Continued upward movement of the left-hand stretch of conveyor 24a will cause continued rotation of this shelf until the same is completely retracted and is disposed in an upright position, as illustrated by the position of the uppermost shelf 50a of the left-hand stretch of conveyor 24a. Thus, when the next extended shelf 50a reaches its final position at the end of conveyor travel, the previously overlying shelf is now out of the line of sight of the consumer through shield 23 and door 14a, thereby permitting unobstructed viewing of the product to be next dispensed.

In FIGS. 1 and 2, it may be seen that the shelf 50 carrying the product visible to the consumer cannot be manually rotated into its retracted position because of the presence of the overlying end portion 84 of locking arm 78. Since the lower end portion 86 of the arm is in engagement with one of the side flanges 54 of the underlying shelf 50, swinging movement of arm 78 about hinge pin 80 cannot be effected until the condition occurs that is illustrated in FIG. 4.

After the consumer has removed the product from conveyor 24 and returned door 14 to the closed position, the second phase of conveyor movement is initiated as discussed hereinabove. The solid lines in FIG. 4 show the positions of the two shelves 50 after the first phase of conveyor movement which places the upper shelf in exact horizontal alignment with platform 22. The broken lines illustrate the positions of the two shelves as the same move upwardly during the second phase of conveyor movement. At this time, the lower shelf 50 moves out of engagement with the lower end portion 86 as the upper shelf 50 moves into engagement with the upper end portion 84, thereby permitting rocking arm 78 to move in a clockwise direction to clear the upper shelf as illustrated by the broken lines.

In FIG. 2 the shelf 50a which is inclined upwardly to the left would remain in this approximate position if the product was not removed prior to commencement of shifting of this shelf to its retracted position. It is apparent that the product will become wedged between the shelf and panel 56a, thereby causing damage to the conveyor if the drive motor therefor is permitted to continue operation.

FIG. 5 illustrates the manner in which drive motor 38 of conveyor 24 is disabled in the event that a consumer fails to remove a product from this conveyor after making the selection. It is assumed that cam 44 makes one complete revolution during each 2-phase increment of conveyor movement. Energization of the motor is effected by a suitable electrical power source (not shown) via leads 102 and 104. Lead 102 serves as a common supply lead, while lead 104 is coupled with control circuitry (not shown) which closes the power circuit to motor 38 when the door 14 is closed after making a product selection. Lead 106 is connected directly to the power source and is energized at all times.

Relay coil 88 is shown in its normally energized state maintaining switches 90 and 92 closed. Switch 76 (controlled by the position of element 66) is in series with the common side of the line to coil 88, while switch 48 (under the control of cam 44) is connected to coil 88 in parallel with switch 76.

As a shelf 50 shifts toward the retracted position thereof by engagement of its projection 60 with edge 64, switch 76 momentarily opens as the shelf moves element 66 and then recloses as the shelf moves beyond the element if the product has been removed from the shelf. This ordinarily has no effect on the energized state of coil 88 since cam 44 is disposed on shaft 40 such that opening of switch 48 does not occur until after switch 76 has had time to open and reclose under normal conditions. However, should a product remain on the shelf, switch 76 will remain open for a longer than normal time, whereupon opening of switch 48 by cam 44 deenergizes coil 88. This effects opening of switches 90 and 92, the former switch breaking the power circuit to motor 38.

When the condition occurs, service or operating personnel must effect reclosure of switch 76 by removal of the lodged product before operation of this conveyor may be resumed. Reclosure of switch 76 re-energizes relay coil 88 and thereby re-establishes the circuit through switch 90. Motor 38 completes its cycle and once again relay coil 88 will not be deenergized unless both switches 48 and 76 are open at the same time.

As explained previously, the switch 92 is in series with the power circuit to the drive motor of conveyor 24a. Therefore, conveyor 24a is disabled simultaneously with the disabling of conveyor 24 by the presence of a lodged product in conveyor 24. The present structure achieves close spacing of adjacent conveyors by utilizing the area vacated by shelves from which a product has been dispensed to accommodate the shelves of the adjacent conveyor as the latter shelves rotate around their upper sprockets into a hanging position for returning to the lower end of the respective conveyor. Consequently should a product inadvertently not be removed by the consumer before the access door is reclosed and thus prevent the corresponding shelf from assuming its retracted position, the shelf would interfere with the above-said action of the shelves of the adjacent conveyor, likely resulting in damage to both conveyors were it not for the action of switches 92 and 96 associated with respective conveyors. The possibility of jamming two conveyors may be appreciated from viewing FIG. 2 where it may be seen that the outer extremity 108a of the shelf 50a commencing downward movement along the return path would engage the retracted shelf 50 shown by broken lines if this shelf were not substantially retracted. It may also be noted in FIG. 2 that, by the time shelves 50a clear sprocket shaft 28a, the shelves hang as illustrated, thereby clearing the outer extremities 108 of the adjacent extended shelves 50.

Having thus described the invention, what is claimed as new and desired to be secured by Letters Patent is:

1. A dispensing machine comprising:
   a conveyor having a plurality of spaced-apart shelves, each movable from an extended, product-receiving position to a retracted disposition;
   drive means coupled with said conveyor for shifting the latter in a direction to raise said shelves in the extended positions thereof from a product storage zone to a consumer access location, and then return said shelves from said location to said zone; and
   means disposed to shift each shelf upwardly from its extended position to its retracted disposition and in a direction away from the next succeeding shelf during movement of a corresponding shelf away from said location thereof and after removal of its product therefrom, permitting ready consumer viewing of the product carried by the next shelf arriving at said location.

2. The invention of claim 1,
   said shelf retracting means including structure engageable with each shelf for shifting the latter to its retracted disposition as the same is moved away from said location by said drive means.

3. The invention of claim 1,
   each of said shelves being pivotally attached to said conveyor for swinging movement between the extended and retracted dispositions thereof and each including integral structure providing cantilever support in said extended position thereof, and
   said shelf retracting means including structure engageable with each shelf for swinging the latter to its retracted disposition as the same is moved away from said location by said drive means.

4. The invention of claim 1; and
   means coupled with said drive means for disabling the latter in response to failure of a consumer to remove the product on the shelf at said location prior to commencement of movement of the shelf along said return path, whereby to prevent jamming of the conveyor.

5. The invention of claim 4,
   said disabling means including a shiftable element normally extending into said return path and engageable by each shelf, as the latter is moved away from said location, to shift the element to an operated position, control means for effecting said disabling when said element is held beyond a certain period in said operated position, and means coupled with said element and baising the latter toward the normal position thereof, each shelf being disposed out of engagement with said element upon movement to its retracted disposition, whereby said element returns to its normal position and the presence of a loaded shelf in said return path holds said element in said operated position beyond said certain period.

6. The invention of claim 1; and a locking device adjacent said location and operable to prevent manual shifting of a shelf to its retracted disposition when the same is at said location, whereby to prohibit consumer access to products on other loaded shelves.

7. A dispensing machine comprising:

a conveyor having a plurality of spaced-apart shelves, each movable from an extended, product-receiving position to a retracted disposition;

drive means coupled with said conveyor for shifting the latter to move said shelves in the extended positions thereof from a product storage zone to a consumer access location, and thence along a return path from said location to said zone;

means disposed to shift each shelf from its extended position to a retracted disposition, after removal of its product therefrom, permitting ready consumer viewing of the product carried by the next shelf arriving at said location; and a locking device adjacent said location and operable to prevent manual shifting of a shelf to its retracted disposition when the same is at said location, whereby to prohibit consumer access to products on other loaded shelves, said device including an upright arm mounted for pivotal movement and having an upper portion in a position overlocking the shelf at said location, and a lower portion in a position engaging the next lower shelf whereby the device cannot be shifted to release the shelf at said location.

8. The invention of claim 7, said next lower shelf clearing said lower portion of said arm upon movement toward said location by said drive means, thereby the upper portion of the arm is shifted from said position overlocking the shelf at said location upon engagement by the latter as the same commences movement along said return path simultaneously with said movement of the next lower shelf toward said location.

9. A dispensing machine comprising:

a pair of endless, parallel, closely spaced, upright conveyors, each having an upwardly movable stretch and a downwardly movable stretch;

a plurality of shelves pivotally mounted on each of the conveyors for rotation about generally parallel, spaced, horizontal axes, said shelves hanging freely from the conveyors when positioned at and passing along the downwardly extending stretches of respective conveyors;

means operably associated with each of the conveyors and said shelves thereon for shifting the latter into product-supporting disposition extending away from respective conveyors as the shelves move along a portion of the upwardly extending stretches of each conveyor and for maintaining the shelves in such extended positions as the shelves of each conveyor are moved from product-storage zones sequentially to a consumer access location;

drive means coupled to said conveyors for intermittently driving the latter to bring the shelves thereon in extended disposition one by one into said consumer access location; and means operably associated with the shelves of each conveyor for pivoting the same upwardly and away from shelves in said extended positions therebelow as the shelves move from respective consumer access locations toward the upper extremity of said upwardly extending stretches of a corresponding conveyor and for maintaining such shelves in the upwardly tilted disposition thereof until the shelves have moved over the top of the respective conveyor whereby space is provided for movement of the shelves over the top of respective conveyors without interengagement of the shelves of the two conveyors.

10. The invention of claim 9; and means operably intercoupling said conveyors for disabling both conveyors in response to failure of a consumer to remove a product from a shelf at said consumer access location whereby to prevent jamming between the shelves of said pair of conveyors.

11. A dispensing machine comprising:

a pair of endless, parallel, closely spaced, upright conveyors, each having an upwardly movable stretch and a downwardly movable stretch, and provided with a plurality of spaced-apart shelves, drive means coupled with each of said conveyors, respectively, for shifting each conveyor through an increment to move a shelf from a product storage zone to a consumer access location, and thence along a return path from said location to said zone, said shelves being operable through a first arc into upstanding retracted positions between said location and the upper end of said upwardly movable stretch of each conveyor and thence over the top and through a second arc into hanging positions which are retained through said downwardly movable stretch of each conveyor toward said zone, said conveyors being disposed with their extended shelves extending in the same direction and with the extended shelves of the upwardly movable stretch of one of said conveyors projecting toward and closely adjacent the hanging shelves of the downwardly movable stretch of the other conveyor; and means associated with each conveyor respectively and disposed to shift each shelf thereof through said first arc from its extended position to its retracted disposition upon movement of each shelf away from said location after removal of its product therefrom whereby space is provided for movement of the shelves of said other conveyor through said second arc into said hanging position without interengagement of the shelves of the two conveyors.

References Cited by the Examiner

UNITED STATES PATENTS

| | | | |
|---|---|---|---|
| 1,506,843 | 9/1924 | Komarnisky | 198—158 X |
| 2,594,589 | 4/1952 | Runton | 198—158 X |
| 2,827,159 | 3/1958 | Peteler | 198—232 |
| 2,861,677 | 11/1958 | Van Marle | 198—232 |
| 3,074,511 | 1/1963 | Joyce | 186—1 |
| 3,227,501 | 1/1966 | Austin et al. | 312—97 |

EVON C. BLUNK, *Primary Examiner.*

M. L. AJEMAN, *Assistant Examiner.*